(No Model.)

E. O. EATON.
KETTLE.

No. 347,334. Patented Aug. 17, 1886.

Witnesses
Walter Allen
W. S. Boyd

Inventor
E. O. Eaton.
By his Attorney
Herbert W. T. Jenner.

United States Patent Office.

EDMUND OCTAVIUS EATON, OF LONDON, COUNTY OF MIDDLESEX, ENGLAND.

KETTLE.

SPECIFICATION forming part of Letters Patent No. 347,334, dated August 17, 1886.

Application filed January 20, 1886. Serial No. 189,147. (No model.) Patented in England October 10, 1885, No. 12,065.

*To all whom it may concern:*

Be it known that I, EDMUND OCTAVIUS EATON, a citizen of Great Britain, residing in London, in the county of Middlesex, England, have invented certain new and useful Improvements in Quick-Boiling Kettles, (for which I have obtained a patent in Great Britain No. 12,065, bearing date October 10, 1885;) and I do hereby declare the following to be a full, clear, and exact description of the invention, such as will enable any one skilled in the art to which it appertains to make and use the same, reference being had to the accompanying drawings.

This invention relates to kettles and other similar culinary vessels; and it consists in providing them with means for creating a draft and increasing the combustion of the fire over which they are placed, instead of damping it, as is the case when the kettle is constructed in the ordinary manner.

This invention further consists in increasing the heating-surface of the kettle where exposed to the fire.

Figure 1:
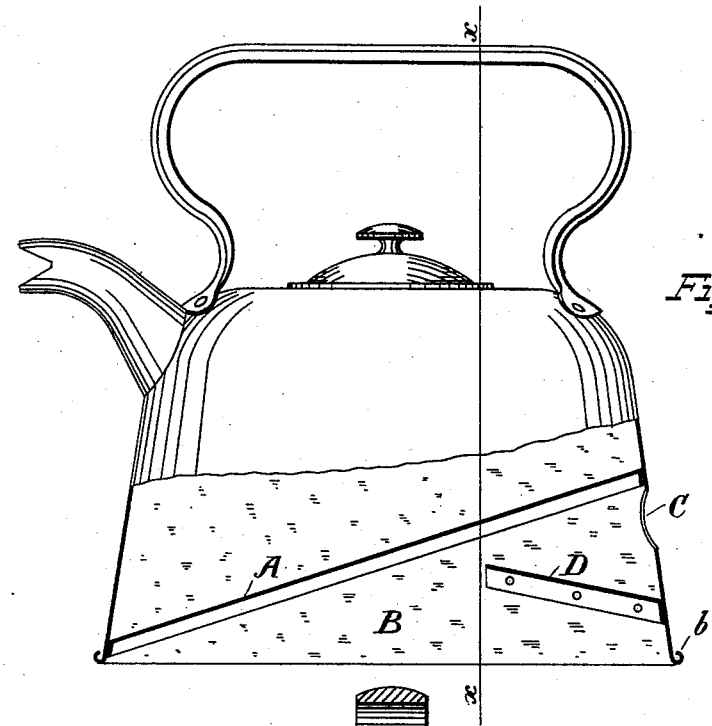
Figure 2:
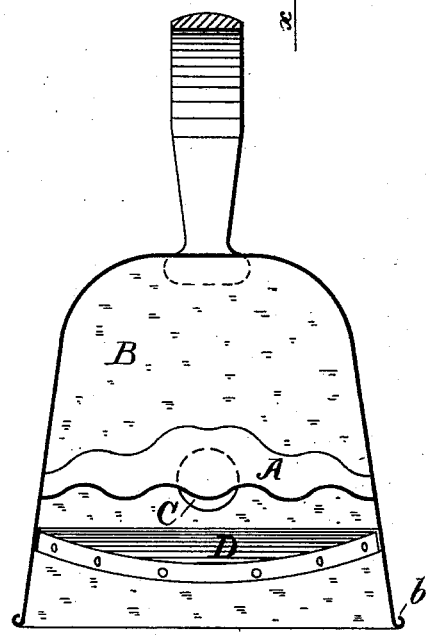

In the drawings, Figure 1 is a side view, partly in section, showing a kettle constructed according to my invention. Fig. 2 is a cross-section through the kettle, taken on the line $x$ $x$ in Fig. 1.

Similar letters of reference indicate corresponding parts in both figures.

The kettle may be constructed of any convenient shape or size; but instead of having its bottom formed in the usual manner it is provided with the bottom plate, A, of corrugated sheet metal. This bottom plate, A, is placed at an angle and secured to the sides B, which extend for some distance below it, and are provided with a bead, $b$, at their lower edge. A hole, C, is formed through the side of the kettle beneath the highest part of the bottom plate, A, which, by preference, is made to come at the back of the kettle. The heat or flame from the fire over which the kettle is placed is drawn upward and passes out of the hole C, which creates a draft. The bottom being corrugated and placed at an angle presents a very large heating-surface to the flame, which passes freely up the slope.

D is a baffle-plate, secured to the sides of the kettle beneath the hole C. This baffle-plate distributes the heat uniformly over the corrugated bottom of the kettle and prevents it from rushing out of the hole C without coming in contact with the said bottom plate.

The kettle is provided with a lid, handle, and spout of any suitable form commonly in use. It can be easily cleaned out, and does not hold materially less water than an ordinary kettle.

Kettles constructed according to this invention will heat a greater quantity of water in less time with a given amount of fuel than those constructed in the ordinary manner.

Having thus described my invention, what I claim as new, and desire to secure by Letters Patent, is—

1. A culinary vessel provided with a sloping bottom plate, sides extending below the said bottom plate and having a hole through one side beneath the highest part of the said bottom plate, and a baffle-plate beneath the said hole secured to the sides, substantially as and for the purpose set forth.

2. A culinary vessel provided with a sloping bottom plate of corrugated material, sides extending below the said bottom plate and having a hole through one side beneath the highest part of the said bottom plate, and a baffle-plate beneath the said hole secured to the sides, substantially as and for the purpose set forth.

In testimony whereof I affix my signature in presence of two witnesses.

EDMUND OCTAVIUS EATON.

Witnesses:
   ISAAC DISS POLLARD,
   HENRY BRASSINGTON.